United States Patent [19]

Lee

[11] Patent Number: 5,867,380
[45] Date of Patent: Feb. 2, 1999

[54] METHOD AND APPARATUS FOR COMPENSATING VOLTAGE ERROR CAUSED BY DEAD TIME OF MOTOR DRIVING INVERTER

[75] Inventor: Jae Taek Lee, Kunpo, Rep. of Korea

[73] Assignee: LG Industrial Systems Co., Ltd., Seoul, Rep. of Korea

[21] Appl. No.: 819,271

[22] Filed: Mar. 18, 1997

[30] Foreign Application Priority Data

Mar. 26, 1996 [KR] Rep. of Korea ..................... 1996 8383

[51] Int. Cl.⁶ .............................. H02M 5/293; H02P 5/28
[52] U.S. Cl. ................................ 363/98; 363/41; 318/811
[58] Field of Search .................................. 363/41, 58, 98, 363/132; 318/800, 801, 811, 798, 799

[56] References Cited

U.S. PATENT DOCUMENTS

| | | | |
|---|---|---|---|
| 5,341,081 | 8/1994 | Yamada | 318/800 |
| 5,450,306 | 9/1995 | Garces et al. | 363/41 |
| 5,475,293 | 12/1995 | Sakai et al. | 318/802 |
| 5,550,450 | 8/1996 | Palko et al. | 318/800 |
| 5,594,670 | 1/1997 | Yamamoto | 304/571.01 |
| 5,623,192 | 4/1997 | Yamamoto | 318/811 |
| 5,671,130 | 9/1997 | Kerkman et al. | 363/41 |

*Primary Examiner*—Adolf Berhane
*Attorney, Agent, or Firm*—Oliff & Berridge, PLC

[57] ABSTRACT

A method and apparatus for compensating a voltage error caused by a dead time of a motor driving inverter outputs command current, generates command voltage by proportionally integrating the command current on a basis of a starting point in which a polarity of current being applied to a motor is varied, converts the command voltage to a control signal in a pulse width modulator, and transmits the command voltage to the inverter, whereby a current distortion occurring around a zero current becomes minimized and a torque ripple becomes decreased in accordance therewith.

10 Claims, 6 Drawing Sheets

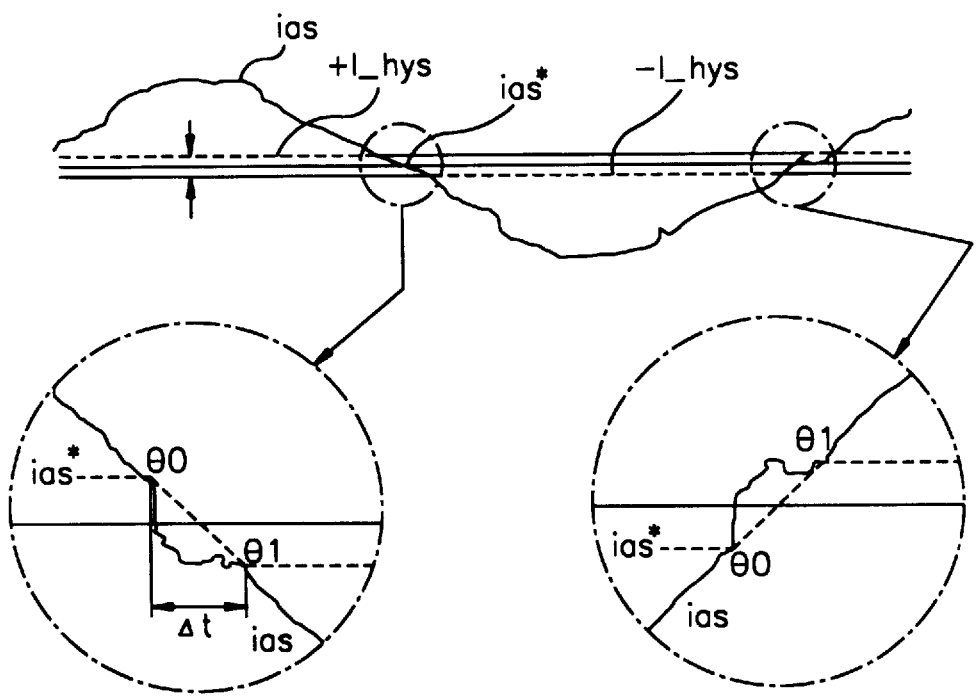

METHOD AND APPARATUS FOR COMPENSATING VOLTAGE ERROR CAUSED BY DEAD TIME OF MOTOR DRIVING INVERTER

BACKGROUND OF THE INVENTION

1. Field of the Invention

The present invention relates to a technology for compensating a voltage error caused by a dead time, and more particularly to an improved method and apparatus for compensating a voltage error caused by a dead time of a motor driving inverter which makes it possible to compensate for a distortion of output current resulting from the dead time occurring at a point in which the output current of the inverter is varied.

2. Description of the Prior Art

Referring to FIG. 1 illustrating a motor driving apparatus which employs a conventional inverter, a three-phase alternating current power source AC is rectified via six diodes D11–D16 in a converter 1 and smoothed by smoothing condensers C1, C2 which are connected in series and in parallel with the phase rectifiers, and the rectified and smoothed direct current voltage is switched and supplied to a motor IM in accordance with control signals CS1–CS6 applied to respective gates of six switching devices Q1–Q6 in an inverter 2.

A current detector 3 detects the current supplied to motor IM, and converts the detected value to a digital value which is then transferred to a control unit 4, and in accordance with the converted current value the control unit 4 generates a three-phase voltage command signal. A pulse width modulator 5 carries out a pulse width modulation of the voltage command signal and generates control signals CS1–CS6 which are then supplied to respective gates of the switching devices Q1–Q6 in the inverter 2.

Here, reference numerals D1–D6 denote freewheel diodes and are connected in parallel with each of the switching devices Q1–Q6.

With reference to FIGS. 2 through 4, a method for compensating a voltage error caused by a dead time occurring in a motor driving inverter according to a conventional art will now be described.

The power source AC rectified, smoothed and converted into a direct voltage in the converter 1 is applied to the inverter 2. The switching devices Q1–Q6 which are grouped to three pairs Q1, Q4; Q2, Q5; Q3, Q6, wherein each of the pairs are connected in parallel with each other, are alternatingly turned on/off, in accordance with control signals CS1–CS6. At this time, when two switching devices for example devices Q1 and Q4 as shown in FIG. 2A are simultaneously turned on, there is formed a current path in accordance with devices Q1 and Q4 thereby resulting in damaging the inverter 2. Therefore, as shown in FIG. 2B, in order to prevent the pair of switching devices Q1, Q2, from simultaneously turning on, whenever a switching state is changed, there is required a dead time t which denotes a simultaneous off-state of the two switching devices Q1, Q4. Here, dead time t is required to drive motor IM using inverter 2.

However, dead time t causes an error voltage between a command voltage and an output voltage to occur in the inverter 2, thereby resulting in disadvantages such as current distortion and hunting.

Conventional dead time compensating methods for a motor driving inverter rendered to solve these disadvantages include a first method in which the dead time is compensated for by applying a voltage to each end of the switching devices comprising the inverter, and a second method employing the output current of the inverter. The first method requires an additional voltage detecting device and noise may be incurred to the entire system as an undesired consequence during realization of the device, so that the second method is generally preferred.

The second method will now be described with reference to FIGS. 3 and 4.

FIG. 3 shows a flow chart for calculating a compensating voltage $V_D$ so as to compensate a voltage error in accordance with a dead time.

Current detector 3 detects (step S1) current i1 applied to motor IM as shown in FIG. 2C. Control unit 4 judges (step S2) polarity of the detected current i1. Here, if the value of the detected current is positive, a compensating voltage $V_D$ for compensating a voltage error according to a dead time is set as a predetermined positive value. If the value of the detected current remains negative, the compensating voltage $V_D$ is set (steps S3–S4) as a predetermined negative value.

Next, by adding a command voltage Vas* to the compensating voltage $V_D$, there is obtained (step S5) a new command voltage Vas*_new.

As shown in FIG. 4 showing a detailed composition view of the control unit 4, a coder 41 judges whether polarity of an output current i1 in the inverter 2, that is, an input current $i_{as}$ is positive or negative, and if judged positive a positive value is outputted, and then the positive value is multiplied at a multiplier 43 by a dead time compensating voltage Vdead which is added to a command voltage Vas* at an adder 42 to be thereby outputted outside the control unit 4. The outputted voltage denotes a command voltage Vas*_new and is applied to the pulse width modulator 5 in FIG. 1, and the pulse width modulator 5 carries out a pulse width modulation of the command voltage Vas*_new and outputs control signals CS1–CS6 for controlling switching devices Q1–Q6.

Whereas, when the polarity of current $i_{as}$ is judged as negative, the command voltage Vas*_new is obtained by subtracting dead time compensating voltage Vdead from command voltage Vas* of the inverter.

As described above, conventionally there has been only considered a polarity variation resulting from adding/subtracting dead time compensating voltage Vdead serving as an offset voltage to/from command voltage Vas*, by judging the polarity of current.

However, a dead time compensating voltage is instantly shifted from negative to positive or vice versa so that current is distorted instead of being sinusoidal, thereby generating torque ripple in accordance therewith.

Further, when a motor is in a lower speed mode, the distortion of current wave causes the torque ripple to become larger.

SUMMARY OF THE INVENTION

Therefore, it is a first object of the present invention to provide a method and apparatus for compensating a voltage error caused by a dead time of a motor driving inverter which prevents current being supplied to the motor from distorting around zero current.

It is a second object of the present invention to provide a method and apparatus for compensating a voltage error caused by a dead time of a motor driving inverter which calculates command current being slowly shifted between intervals in which a polarity of output current becomes varied, generates command voltage by proportionally integrating the difference between the command current and detection current, and applies the command voltage to an inverter, thereby preventing the current from distorting.

To achieve the above-described objects, there is provided a method for compensating a voltage error cause by a dead time of a motor driving inverter which includes a first step for detecting an output current applied from an inverter to a motor, subtracting, when a polarity of the current is positive, a dead time compensating voltage from an inverter command voltage, and adding, when a polarity of the current is negative, the dead time compensating voltage to the inverter command voltage, thereby outputting a new command voltage, a second step for obtaining a command current if the output current exists inside a hysterisis band, a third step for performing a proportionally integrating control in accordance with the command current and the output current and outputting a new compensating voltage, and a fourth step for adding the new compensation voltage to the command voltage obtained in the first step and applying the added value serving as a control signal to respective switching means in the inverter.

BRIEF DESCRIPTION OF THE DRAWINGS

FIG. 7A is a timing diagram, and FIGS. 7B and 7C are enlarged views of command current and current detection according to the present invention.

DETAILED DESCRIPTION OF THE INVENTION

Figure 1:
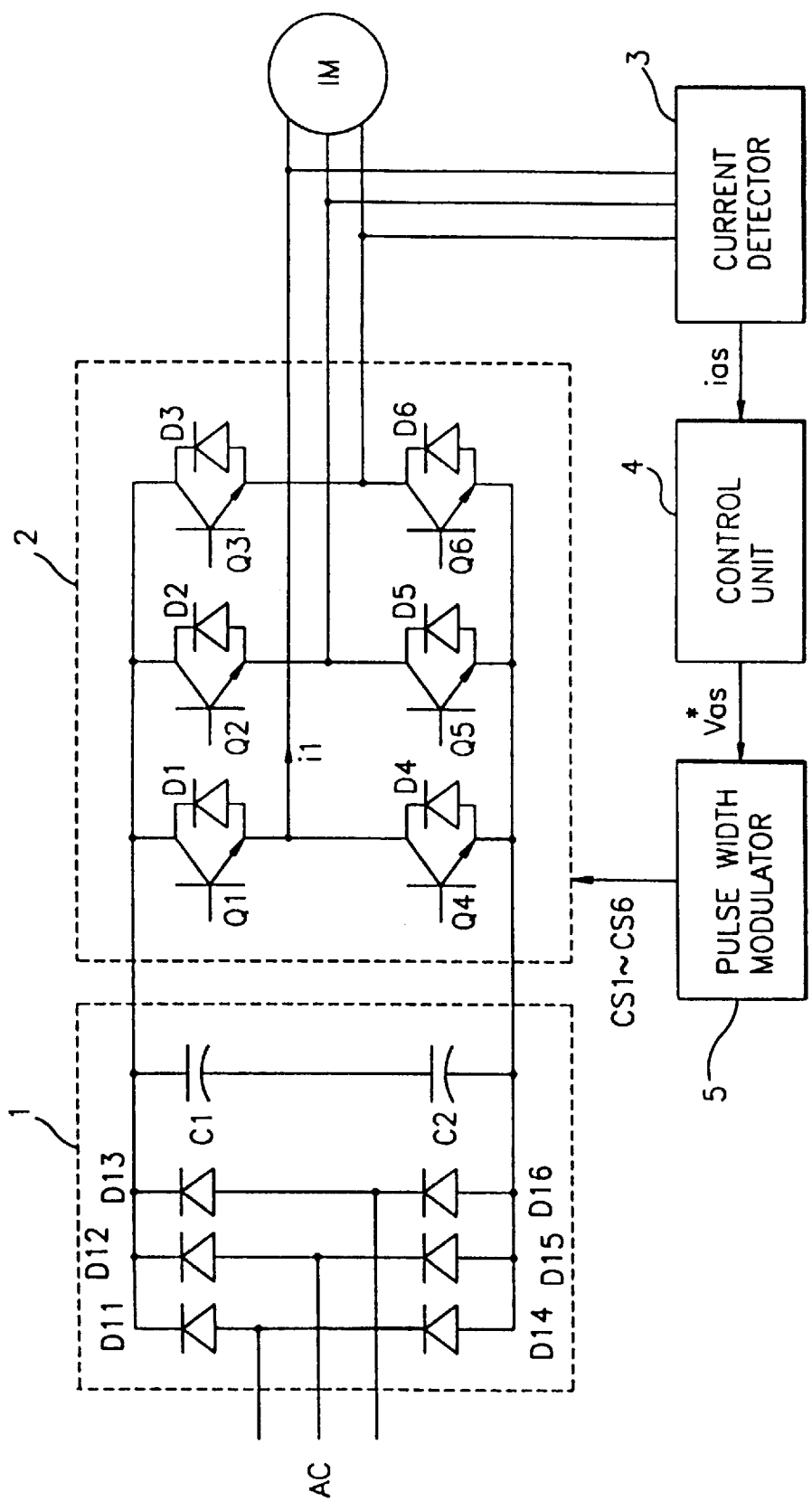
FIG. 1 is a schematic block diagram of a conventional dead time compensating apparatus employing an inverter.
Figure 2A:
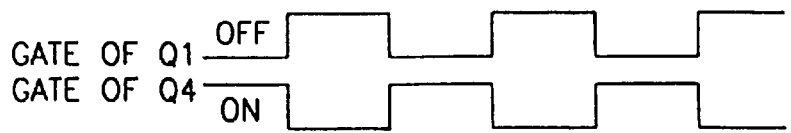
FIG. 2A is a timing diagram of a signal applied to respective gates of two switching devices Q1, Q4 connected in parallel with each other in an inverter in FIG. 1, when a dead time is not considered, according to the conventional art.
Figure 2B:
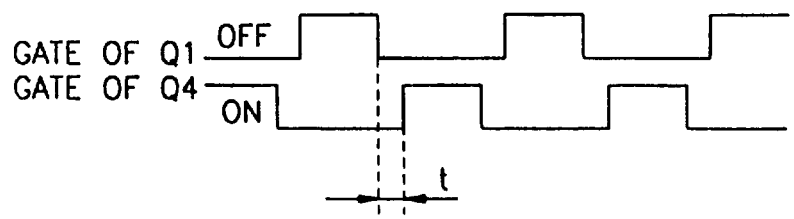
FIG. 2B is a timing diagram of a signal applied to respective gates of two switching devices Q1, Q4 connected in parallel with each other in the inverter in FIG. 1, when a dead time is considered, according to the conventional art.
Figure 2C:
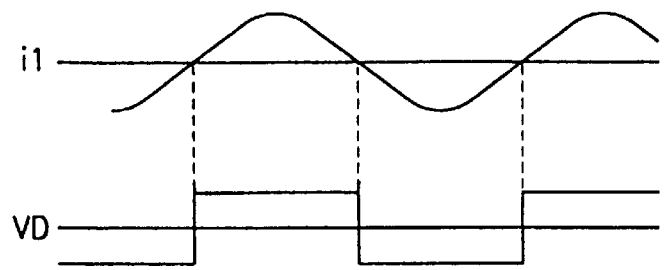
FIG. 2C is a timing diagram of the output current of the inverter in FIG. 1 and the compensating voltage $V_D$.

With reference to the accompanying drawings, the apparatus for compensating a voltage error caused by a dead time with regard to a motor driving inverter according to the present invention is identical to that of FIG. 1 except for an improvement of the control unit 4, so description thereof will be omitted.

Figure 4:
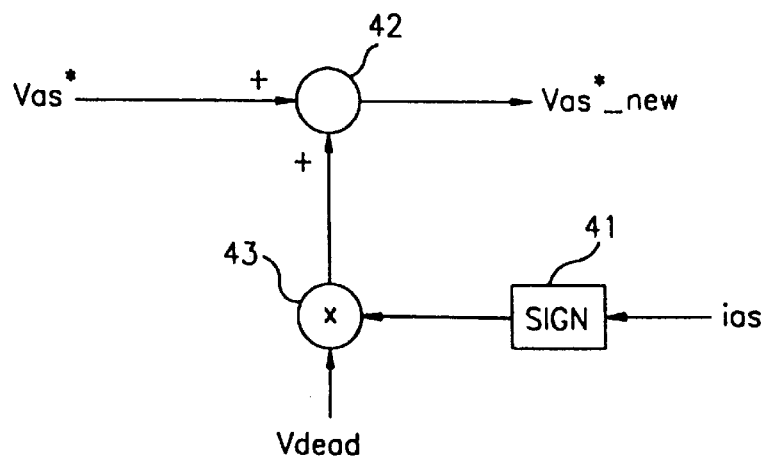
FIG. 4 is a detailed block diagram of a control unit in FIG. 1.
Figure 6:
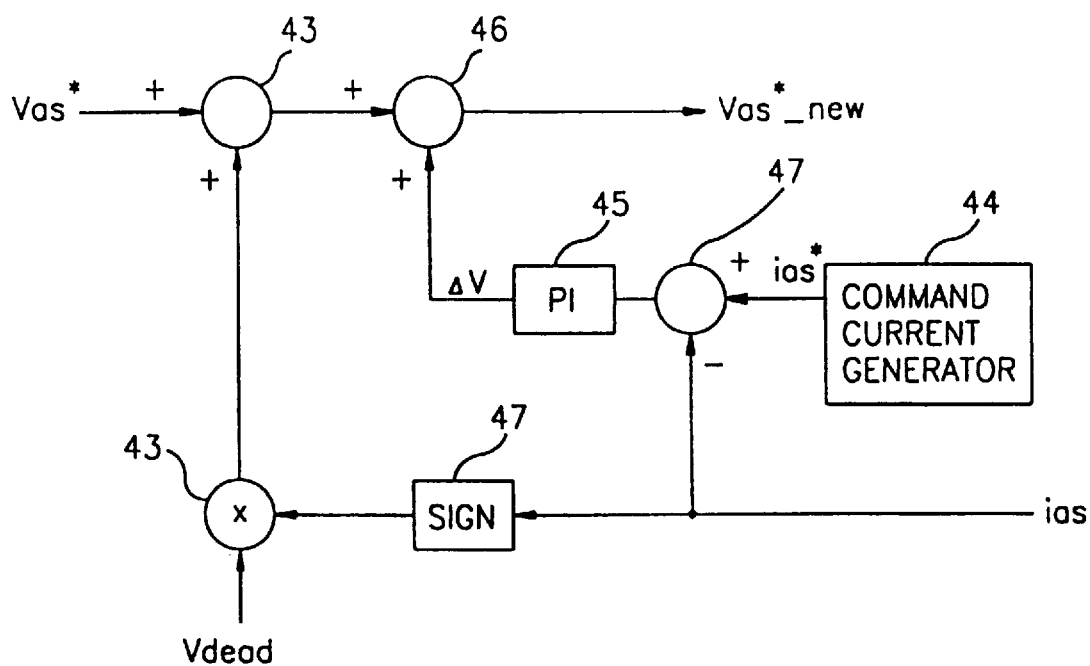
FIG. 6 is a detailed block diagram of an improved control unit according to the present invention.

With reference to FIG. 6 showing a detailed view of an improved control unit 4 according to the present invention which improves over the control unit in FIGS. 1 and 4, the dead time compensating apparatus is provided with a first adder 43 for adding the dead time compensating voltage Vdead and a command voltage Vas* to obtain an inverter command voltage in accordance with the polarity of output current ias and by considering a hysterisis band, a command current generator 44 for inputting the output current ias and generating a command current ias* in a subtractor 47 subtracting the output current ias from the command current ias*, a proportional integrator 45 for proportionally integrating an output signal of the subtractor 47, and a second adder 46 for adding an output value of the proportional integrator 45 to the inverter command voltage of the first adder 43, whereby a final command voltage Vas*_new is outputted from the second adder 46.

The dead time compensating method of the thusly constituted control apparatus for a motor driving inverter according to the present invention will now be described with reference to the accompanying drawings.

Figure 3:
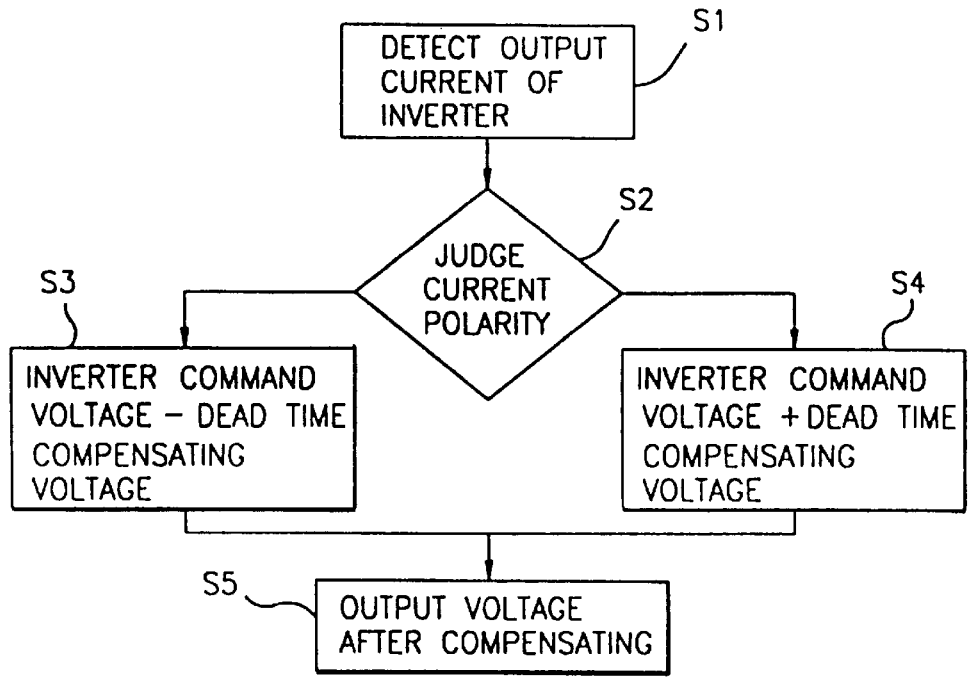
FIG. 3 is a flow chart illustrating a dead time compensating method for a motor driving inverter according to the conventional art.
Figure 5:
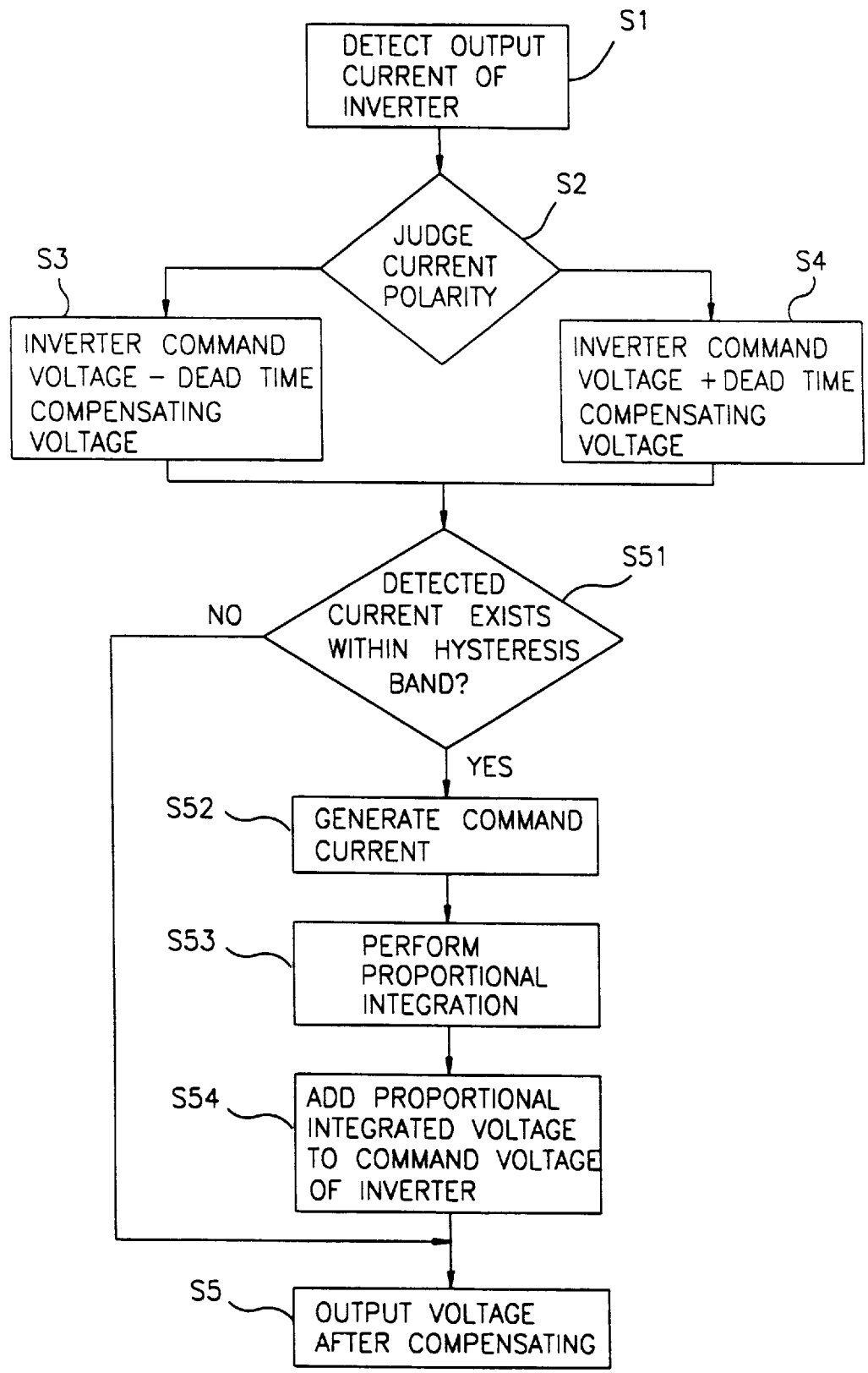
FIG. 5 is a flow chart illustrating a method for compensating a voltage error caused by a dead time of a motor driving inverter according to the present invention.

FIG. 5 shows a flow chart of a dead time compensating method for a motor driving inverter according to the present invention, wherein the steps S1–S4 for detecting the output current ias of the inverter and adding or subtracting a dead time compensating voltage in accordance with the polarity of the output current ias are identical to those of steps S1–S4 in the conventional method of FIG. 3.

Next, it is judged whether the detection current ias exists inside the hysterisis band. That is, as shown in FIGS. 7A, 7B and 7C, is judged in step (S51) whether the value of the detected current ias exists between an uppermost value +I_hys and a lowermost value -I_hys of the hysterisis band.

If the detected current ias is varied from a positive value to a negative value, a current value $i_{hys}$ serving as a hysterisis band width is divided by an absolute value $|i_{as}|$ which is the maximum value of the inverter output value, and if the value takes up a reverse sine function, a incoming point $\theta_0$ of the hysteresis band width is obtained as follows.

$$\theta_0 = \sin^{-1}\left(\frac{i_{hys}}{|i_{as}|}\right) \quad (1)$$

Here, $i_{hys}$ equals 2*I_hys. Also, the $|i_{as}|$ is obtained by the following equation. Here, $i_{qs}$ and $i_{ds}$ are 2 phase currents which are obtained from the inputted 3 phase currents.

$$|i_{as}| = \sqrt{i_{qs}^2 + i_{ds}^2} \quad (2)$$

A point $\theta_1$ from which the detected current $i_{as}$ deviates the hysteresis band width is obtained, as shown by the following equation, by integrating an output frequency $\omega_e$ of the inverter during a time $\Delta t$ in which the detected current $i_{as}$ exists in the hysteresis band.

$$\theta_1 = \int_0^{\Delta t} \omega_e dt \quad (3)$$

Command current $i_{as}^*$ is obtained by multiplying a maximum value of the inverter output current $|i_{as}|$ with a sine function as shown in the following.

$$i_{as}^* = |i_{as}| \sin(\theta_1 - \theta_0) \quad (4)$$

Accordingly, the command current ias* is gradually varied at a predetermined rate in the hysteresis band.

Meanwhile, when the detected current $i_{as}$ varies from negative to positive, $\theta_0$ is obtained (step S52) using the lowermost value I_hys of the hysteresis band.

The above steps are carried out in the command current generator 44 of FIG. 6, and the output of the command current generator 44 as the inverter command current $i_{as}^*$ is subtracted from the output current ias and is applied to the proportional integrator 45 in which equation (5) is operated (step S53) as follows.

$$\Delta V = PI(i_{as}^* - i_{as}) \quad (5)$$

Here, PI denotes a proportional integral constant, and the output $\Delta V$ of the proportional integrator 45 is added (step S54) to output ($V_{as}^* \pm$Vdead) of the first adder 43 to be thereby outputted (step S55) as the final inverter command voltage ($V_{as}^*$_new) which is applied to the pulse width modulator 5. The command voltage (Vas*_new) is applied to the respective gates of the six switching devices Q1–Q6 of the inverter 6 as control signals (CS1–CS6), whereby the turning on/off time of the switching devices Q1–Q6 is controlled.

As described above, when the polarity of inverter output current varies, a slowly varied command current is obtained and the command voltage obtained in accordance with the command current is applied to the inverter, whereby the torque ripple and current distortion become decreased around the zero crossing current and further the effect thereof becomes much improved during a low speed operation.

What is claimed is:

1. A method for compensating a voltage error caused by a dead time of a motor driving inverter, comprising:
   a first step for subtracting/adding a dead time compensating voltage from/to an inverter command voltage, according to inverter output current applied from the inverter to a motor and for thereby outputting a new command voltage;
   a second step for obtaining a command current if the detected output current exists inside a hysteresis band having a predetermined width nearby the zero current;
   a third step for subtracting the output current value from the command current value, proportionally integrating the subtracted value, and outputting a new compensating voltage; and
   a fourth step for adding the new compensation voltage to the new command voltage obtained in the first step, and carrying out a pulse width modulation of the added value.

2. The method of claim 1, wherein a magnitude of the command current generated in the second step is obtained by squaring respective current values obtained by converting the three-phase output current to a two-phase current, adding each of the respective squared values and taking the square-root of the added value, and a frequency of the command current is obtained on a basis of a incoming point at which the output current meets the hysteresis band.

3. The method of claim 1, wherein a magnitude of the command current outputted from the command current generator is obtained by squaring respective current values obtained by converting the three-phase output current to a two-phase current, adding each of the respective squared values and taking the square-root of the added value, and a frequency of the command current is obtained on a basis of an incoming point and a deviating point at which the output current meets the hysteresis band.

4. The method of claim 3, wherein the incoming point is obtained according to the equation:

$$\theta_0 = \sin^{-1}\left(\frac{I_{hys}}{|i_{as}|}\right)$$

wherein, $\theta_0$ denotes the incoming point, ias denotes the detected current, and Ihys denotes the hysteresis band width.

5. The method of claim 3, wherein the deviating point is obtained according to the equation:

$$\theta_1 = \int_0^{\Delta t} \omega_e dt$$

wherein $\theta_1$ denotes the deviating point, $\Delta t$ denotes a time in which the detected current ias exists in the hysteresis band, and $\omega_e$ denotes output frequency of the inverter.

6. An apparatus for compensating a voltage error caused by a dead time of a motor driving inverter comprising:
   a converter for rectifying and smoothing a three-phase alternating current power supply;
   an inverter for switching and applying to a motor a rectified and smoothed direct voltage;
   a current detector for detecting an output current of the inverter;
   a control unit for outputting a command voltage to the inverter in accordance with a value of the output current detected in the current detector; and
   a pulse width modulator for carrying out a pulse width modulation of the command voltage and outputting a control signal for driving the converter, wherein the control unit comprises:
   a first adder for adding a dead time compensating voltage to a command voltage in accordance with a polarity of the detected output current applied from the inverter to the motor;
   a command current generator for generating a command current if the command voltage exists within a hysteresis band having a predetermined width nearby a zero current;
   a subtractor for subtracting the output current from the command current;
   a proportional integrator for proportionally integrating an output signal of the subtractor; and
   a second adder for adding an output voltage of the proportional integrator to an output voltage of the first adder and applying the added voltage serving as a command voltage to the pulse width modulator.

7. The apparatus of claim 6, wherein a magnitude of the command current outputted from the command current generator is obtained by squaring respective current values obtained by converting the three-phase output current to a two-phase current, adding each of the respective squared values and taking the square-root of the added value, and a frequency of the command current is obtained on a basis of an incoming point at which the output current meets the hysteresis band.

8. The apparatus of claim 6, wherein a magnitude of the command current outputted from the command current generator is obtained by squaring respective current values obtained by converting the three-phase output current to a two-phase current, adding each of the respective squared values and taking the square-root of the added value, and a frequency of the command current is obtained on a basis of an incoming point and a deviating point at which the output current meets the hysteresis band.

9. The apparatus of claim 8, wherein the incoming point is obtained according to the equation:

$$\theta_0 = \sin^{-1}\left(\frac{I_{hys}}{|i_{as}|}\right)$$

wherein $\theta_0$ denotes the incoming point, ias denotes the detected current, and Ihys denotes the hysteresis band width.

10. The apparatus of claim 8, wherein the deviating point is obtained according to the equation:

$$\theta_1 = \int_o^{\Delta t} \omega_e dt$$

wherein $\theta_1$ denotes the deviating point, $\Delta t$ denotes a time in which the detected current ias exists in the hysteresis band, and $\omega_e$ denotes the output frequency of the inverter.

* * * * *